US008810570B2

(12) United States Patent
Dedhia et al.

(10) Patent No.: US 8,810,570 B2
(45) Date of Patent: Aug. 19, 2014

(54) SYSTEM AND METHOD FOR ACTIVE SELECTION IN A SOLID MODEL

(75) Inventors: Hiren Dedhia, Irvine, CA (US); Eric Mawby, Windham, NH (US); Hui Qin, Shanghai (CN); Feng Yu, Irvine, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1037 days.

(21) Appl. No.: 12/422,552

(22) Filed: Apr. 13, 2009

(65) Prior Publication Data

US 2009/0256843 A1 Oct. 15, 2009

Related U.S. Application Data

(60) Provisional application No. 61/044,626, filed on Apr. 14, 2008, provisional application No. 61/044,629, filed on Apr. 14, 2008.

(51) Int. Cl.

*G06T 17/00* (2006.01)
*G06T 17/10* (2006.01)
*G06F 17/50* (2006.01)
*G06T 19/20* (2011.01)

(52) U.S. Cl.

CPC ......... *G06F 17/50* (2013.01); *G06T 2219/2021* (2013.01); *G06T 17/10* (2013.01); *G06T 2219/2012* (2013.01); *G06T 19/20* (2013.01); *G06F 2217/06* (2013.01)

USPC .......................................................... 345/420

(58) Field of Classification Search

CPC ..... G06F 17/50; G06F 2217/06; G06T 19/20; G06T 2219/2021

USPC .......................................................... 345/420

See application file for complete search history.

(56) References Cited

U.S. PATENT DOCUMENTS 6,629,065 B1 * 9/2003 Gadh et al. ........................ 703/1
7,042,451 B2 * 5/2006 Venkataraman et al. ..... 345/420

(Continued)

FOREIGN PATENT DOCUMENTS

CN 1873647 12/2012
EP 1729233 A2 12/2008

(Continued)

OTHER PUBLICATIONS

Google, SketchUp User's Guide, http://dl.google.com/sketchup/gsu6/docs/ug_sketchup_win.pdf, retrieved from Internet Archive on Jun. 30, 2007.*

(Continued)

*Primary Examiner* — Xiao Wu
*Assistant Examiner* — Charles Tseng

(57) ABSTRACT

A system, method, and computer program for selecting modification features on a solid model that is manipulated in a computer having software instructions, comprising: a computer system, wherein the computer system includes a memory, a processor, a user input device, and a display device; a computer generated geometric model stored in the memory in the memory of the computer system; and wherein the computer system selects a modification feature directly on a solid model using a computer peripheral input that communicates a modification intent from a user; suggests a plurality of additional selection features to include with the modification feature; verifies that the included plurality of additional selection features conforms to the modification intent by a visual highlighting; modifies the solid model according to the modification intent that results in a modified solid model and modified visual display information; and displays the modified solid model using the modified visual display information to the user; and appropriate means and computer-readable instructions.

14 Claims, 11 Drawing Sheets

(56) References Cited

U.S. PATENT DOCUMENTS

| | | | | |
|---|---|---|---|---|
| 7,313,504 | B2 * | 12/2007 | Chin et al. | 703/1 |
| 2003/0067487 | A1 | 4/2003 | Kohls | |
| 2004/0174362 | A1 * | 9/2004 | Celniker | 345/441 |
| 2009/0024362 | A1 | 1/2009 | Linzie | |

FOREIGN PATENT DOCUMENTS

| | | |
|---|---|---|
| JP | 2001307111 | 11/2001 |
| JP | 2003233631 A | 8/2003 |
| JP | 2004234164 | 4/2004 |
| JP | 2006209763 | 8/2006 |
| JP | 2007140641 A | 6/2007 |

OTHER PUBLICATIONS

Anonymous, Oct. 27, 2006. Retrieved from the internet: URL:http://web.archive.org/web/20061027215357/http://download.sketchup.com/OnlineDoc/gsu_mac/H-Principle_Tools/PriTool-Select.htm>, retrieved on Aug. 12, 2009. p. 3, paragraph 6; Others.

Bjorklund. Jul. 2, 2004. Retrieved from the Internet: URL: http://web.archive.org/web/20040702142319/http://christerb.com/tutorials/maya_modeltennisball/index.html>. Retrieved on Aug. 13, 2009. p. 3, paragraph 1; Others.

Sketch Up, Google Inc. 2007; Searched Nov. 21, 2012, URL: http://d1.google.com/sketchup/gsu6/docs/ja/ug¯sketchup_win.pdf; pp. 1-6,76,86-89, 315-321.

First Office Action dated Jul. 3, 2012 in connection with Chinese Patent Application No. 200980122301.9, 11 pages.

Japanese Office Action dated Nov. 30, 2012 in connection with Japanese Patent Application No. 2011-505015, 6 pages.

Sketch Up, Google Inc. 2007; Searched Nov. 21, 2012, URL: http://d1.google.com/sketchup/gsu6/docs/ja/ug_sketchup_win.pdf; pp. 1-6,76,86-89, 315-321.

* cited by examiner

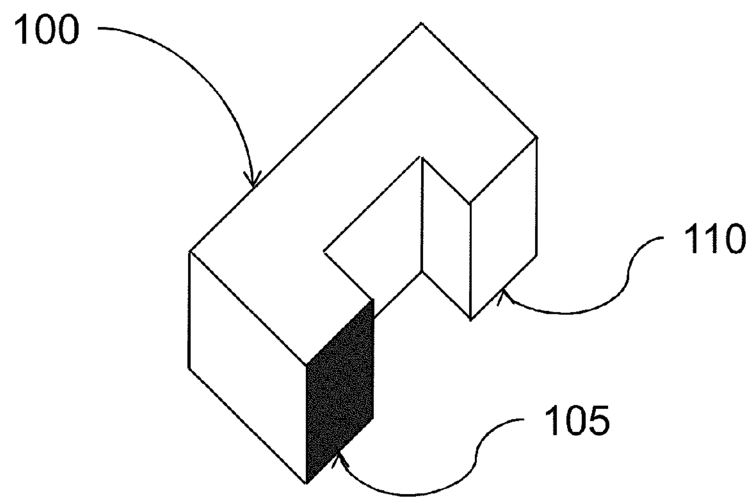
*Fig. 1a*
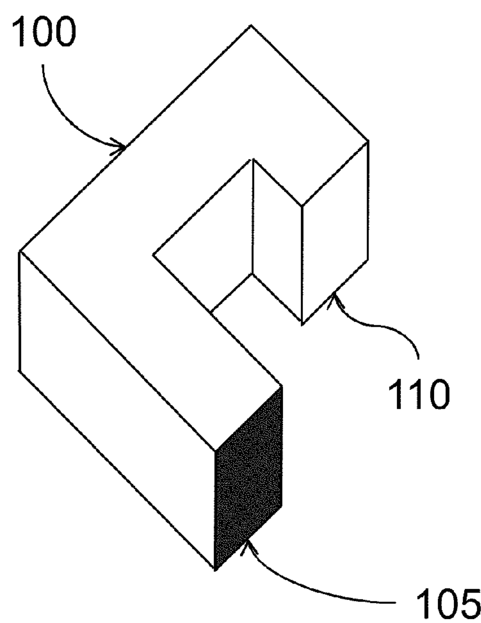
*Fig. 1b*
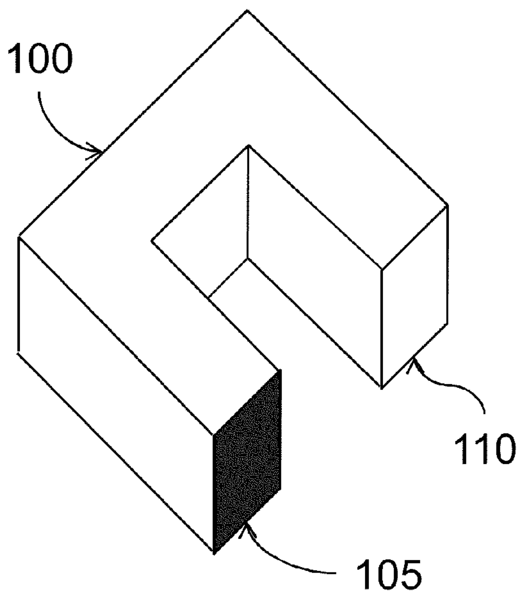
*Fig. 1c*
*Figs. 1a-1c*

SYSTEM AND METHOD FOR ACTIVE SELECTION IN A SOLID MODEL

CROSS-REFERENCE TO RELATED APPLICATIONS

This Application claims priority to pending Provisional U.S. Applications Ser. Nos. 61/044,626 and 61/044,629, both filed on Apr. 14, 2008.

TECHNICAL FIELD

The system of the innovations described herein relates generally to computer-aided design software applications. More specifically, the system relates to suggesting selections in a solid model representation.

BACKGROUND

In today's world of computer-aided design (CAD) applications and geometry modeling systems, parts are commonly designed in one of two ways: history-based or history-less. A history-based system is commonly characterized by the parametric modeling paradigm that emerged in the mid-1980s. In parametric modeling systems, a recipe, or history tree, is created to reflect how things are related to one another. When a change is made to one original item, all items created later in time from the original item are updated. In this way, for example, two faces may remain coplanar, because they were designed with such a relationship captured during the design process and simply "replayed" during the update process. FIGS. 1*a*-1*c* illustrate a trimetric projection of a three-dimensional block. Referring to FIG. 1*a*, a C block 100 in three-dimension ("3D") is viewable to a user on a computer display and is in need of a modification by a user by altering a bottom leg 105, a top leg 110, or both the bottom leg 105 and the top leg 110. In a history-based system, how easily the user modifies the C block 100 depends upon how it was originally designed in the CAD application system, such as NX by Siemens Product Lifecycle Management Software Inc. Commonly, an original designer creates and/or designs a part that is later modified by a modify designer who maybe completely unfamiliar to the original designer. For example, if the original designer, i.e., the person that originally designed the C block 100, had the design method intent to constrain the faces related to the bottom leg 105 and the top leg 110 as coplanar, then the modification action illustrated in FIG. 1*c* is easy to accomplish using known parametric/history-based modeling techniques that are basic to one skilled in the art of 3D model design; when two faces are constrained to be coplanar, moving one face will cause the other face to move as well. On the other hand, modifying the C block 100 in a history-less or the body-based approach taken by companies like CoCreate, IronCAD, and Kubotek, for example, fails to maintain the history-tree made popular by the parametric modeling paradigm. In the history-less approach, changes are made explicitly for each item on a solid model. If the original designer of the C block 100 intended that the faces on the bottom leg 105 and the top leg 110 maintain a coplanar relationship, later modifications require the manual selection of the faces for edit to ensure the desired result, which is difficult if the original designer's intent is unknown or unascertainable. For example, the modify designer can make either change illustrated in FIG. 1*b* or FIG. 1*c* simply be selecting the one face or individually select all of the other coplanar faces, which happens to be a small number in this example but could be in the hundreds in a complex assembly model. Alternatively, some software applications could allow the modify designer to "make faces coplanar" and permanently capture the design intent after the fact at time of edit, but this can also be cumbersome particularly with very large models. This later alteration would make the modification see in FIG. 1*b* difficult at a later date particularly since now the design intent may be baked into the model contrary to design intent.

The issue with the history-based approach is that design intent is incorporated and fixed at the time of model creation. In contrast, the history-less systems are flexible about change at a later date, but capture very little intelligence about how things are related. If modify designers determine to manually capture such intelligence at a later point in time, then, like history-based systems, that intelligence is incorporated and fixed thereby limiting further flexibility.

That said, in the geometry modeling systems, geometry selection techniques involve setting options prior to selecting the geometry, i.e., the designers have to plan ahead to prepare for what they want to select. Planning ahead entails recommended preparatory actions and in many cases recommended error recovery when the selection does not satisfy the modification at hand. In history-less system commands, selection options used to perform a modification are likely to change between command sessions, as well as within the command session. For example, with a move face command, the designer may move a boss, a rib, and a face connecting the boss and the rib in one command session. In another command session, the designer may move a single face or simply a slot.

FIG. 2 illustrates a planning ahead interaction where each arrow represents a different interaction pathway. Referring to FIG. 2, each box represents a cognitive or physical process that occurs depending upon the circumstance identified in the box. The more boxes an arrow intersects, the more processes the pathway entails. "Arrow 1" 200 is the simplest interaction illustrating the selection options are set correctly, and the designer selects what is intended. "Arrow 2" 205 is similar to "Arrow 1" 200 but passes through a recovery meaning the designer does not prepare, unintentionally selects something to modify, and has to recover from the error. "Arrow 3" 210 occurs when the designer interprets the selection option before selecting, thinking the option is set correctly, but still unintentionally selects something that requires the designer to recover the error. "Arrow 4" 215 represents the worst case and occurs when the designer interprets the selection option, determines the need to change the option, changes the option, but still unintentionally selects something that requires the designer to recover from the error. "Arrow 5" 220 occurs when the designer interprets the selection option, determines the need to the change the option, changes the option, and then selects what the designer intended. "Arrow 6" 225 occurs when the designer interprets the selection option, determines it as correct, and then selects what the designer intended.

This cognitive and physical processing may occur with each selection within the command session, where the worst case is that recovery from error is required for each command selection that is a drain on efficiency. Method to recover from an error vary and range from de-selecting the geometry of an individual object to de-select everything to start all over, either of which impose a measurable time penalty on the designer, as well as the immeasurable defeat felt by the designer in the need to recover from the error.

The inventors have advantageously recognized a need for a system and method for active selection in a solid model to alleviate the negative aspects of planning ahead selection.

SUMMARY

To address the identified need and related problems, a system provides a system for selecting modification features on a solid model that is manipulated in a computer having software instructions, comprising a computer system, wherein the computer system includes a memory, a processor, a user input device, and a display device; a computer generated geometric model stored in the memory in the memory of the computer system; and wherein the computer system selects a modification feature directly on a solid model using a computer peripheral input that communicates a modification intent from a user; suggests a plurality of additional selection features to include with the modification feature; verifies that the included plurality of additional selection features conforms to the modification intent by a visual highlighting; modifies the solid model according to the modification intent that results in a modified solid model and modified visual display information; and displays the modified solid model using the modified visual display information to the user.

Other features of the system are set forth in part in the description and in the drawings that follow, and, in part are learned by practice of the system. The system will now be described with reference made to the following Figures that form a part hereof. It is understood that other embodiments may be utilized and changes may be made without departing from the scope of the system.

BRIEF DESCRIPTION OF THE DRAWINGS

A system will hereinafter be described in conjunction with the appended drawings, wherein like designations denote like elements, and:

FIGS. 1*a*-1*c* illustrate a trimetric projection of a three-dimensional block;

DETAILED DESCRIPTION OF THE PREFERRED EMBODIMENTS

1. Introduction

A method and system for modifying geometric relationships in a solid model are described. In the following description, for the purposes of explanation, numerous specific details are set forth in order to provide a thorough understanding of the system. It will be apparent, however, to one skilled in the art that the system may be practiced without these specific details. In other instances, well-known structures and devices are shown in block diagram form in order to avoid unnecessarily obscuring the system.

Figure 2:
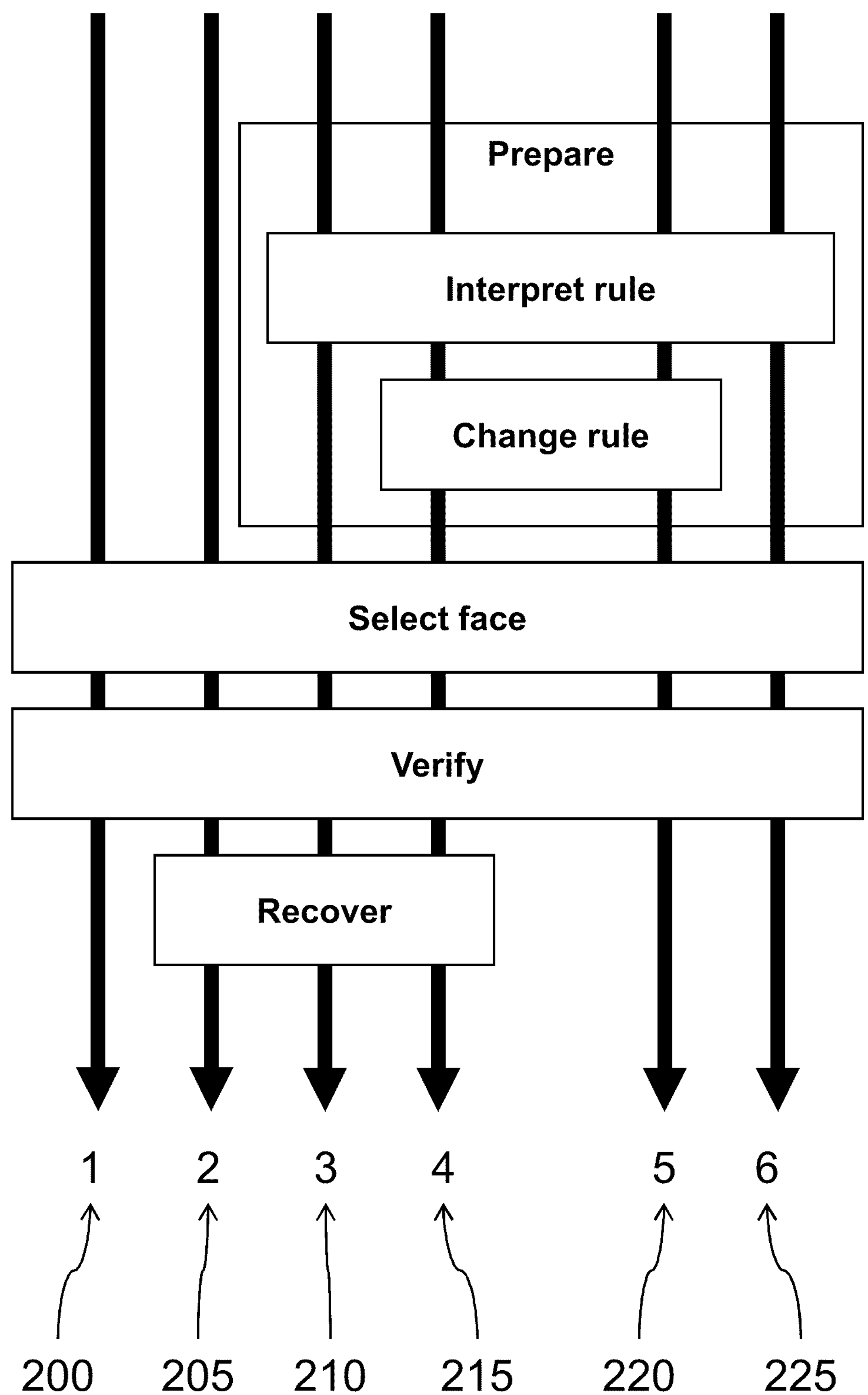
FIG. 2 illustrates a planning ahead interaction where each arrow represents a different interaction pathway.
Figure 3:
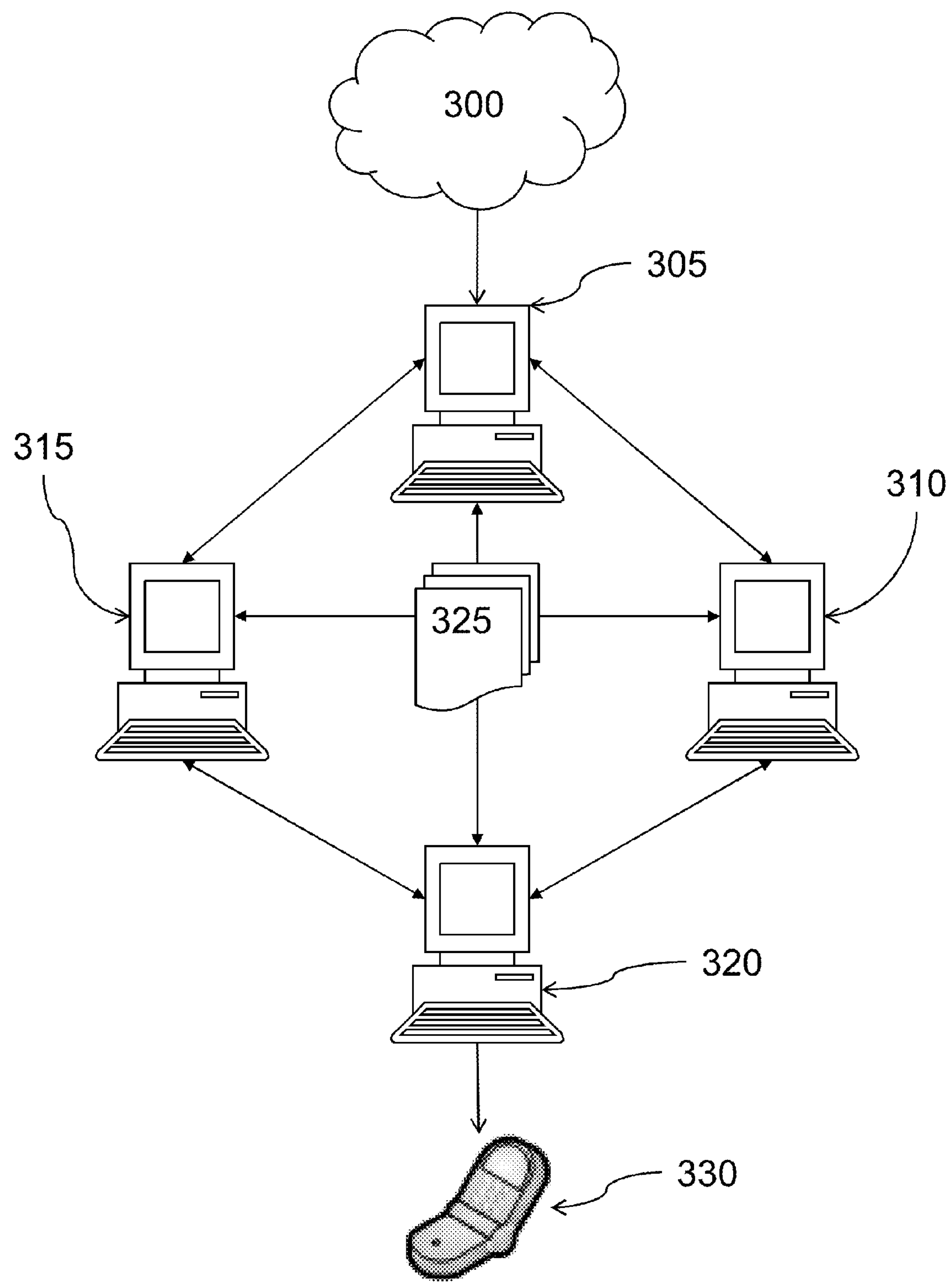
FIG. 3 illustrates a sample virtual product development environment.

FIG. 3 illustrates a sample virtual product development environment. The virtual development environment employed today typically begins with a customer request, or an innate desire, to create or improve upon a product, generally shown at 300. That product can be as simple as a bottle opener or as complex as a submarine. Referring further to FIG. 3, an original designer models a desired product according to known methods employed by a computer-aided design (CAD) application 305, The CAD application 305 is executed on a general computing machine which subsequently becomes a specific purpose computing environment for the sake of executing computer-aided design routines at the time of application execution and interaction, the details of which are discussed below. The CAD application 305 is preferably SolidEdge or NX both offered for license by Siemens Product Lifecycle Management Software Inc. A CAD user operates the CAD application 305 in a well known and understood manner so as to virtually display a solid model that resembles and conforms to an original design requirement ascertained from the customer request or the innate desire. The solid model is commonly an assembly of components and assemblies, where the assemblies are further broken down into sub-assemblies and/or components, all preferably having a virtual representation stored for subsequent recall in solid model data files 325.

Once the solid model is determined to be in a suitable form comporting to the original design requirements, it is preferably tested using a computer-aided engineering (CAE) application 310 such as NX CAE or FEMAP offered by Siemens Product Lifecycle Management Software Inc by a CAE user for part fault-tolerance tests and a variety of other engineering tests. If the CAE user determines that the solid model has to be modified to successfully pass the fault-tolerance tests the solid model is returned to the CAD user for modification in the CAD application 305. This iteration between the CAD application 305 and the CAE application 310 and the respective users is recursive until the solid model successfully passes necessary design requirements and engineering test.

Following successful completion, the solid model in its final design form is further designed for physical manufacture in a computer-aided manufacturing (CAM) application 315 such as NX CAM or CAM Express both offered by Siemens Product Lifecycle Management Software Inc. By using the CAM application 315, a CAM user will model how numerical control programs, molds, tools and dies manufacture a physical product 330. The CAM user may have additional modifications to comport to the original design requirements, for example, using eletro-discharge machining (EDM) may require different techniques depending if a wire-cut EDM or die-sinking EDM is used to manufacture the physical product 330. To virtually mill a part, the CAM application 315 defines the preferably electrode path of the orbit for the EDM process. The CAM user may determine that in order to comport to design and engineering requirements, the solid model requires a subtle modification in dimensions, for example following a cool-down to allow for hardening of the material comprising the physical product 330.

Following the successful virtual designing, engineering, and manufacturing of the product, a manufacturer can link all manufacturing disciplines with product engineering related to the product including: process layout and design, process simulation/engineering, and production management utilizing a digital factory application 320 such as Tecnomatix offered by Siemens Product Lifecycle Management Software Inc. The manufacturer may find the need to modify the physical product 330 because the CAM users modeled the product with, for example, an EDM system that is outdated and requires the manufacturer to use a 5-axis turning machine to create the necessary blank or the manufacturer has shifted to injection molding rather than compression molding to form the parts that comprise the physical product 330. For example, the solid model has to be modified to comport to the final requirements to manufacture the physical product 330.

Throughout the virtual product development described above, the product design flowed for example from the customer request to the CAD user to the CAE user to the CAD user, back to the CAE user, to the CAM user, and then to the Manufacturer for physical production of the physical product 230. With each edit to the solid model, geometric relationships are also modified so as to comport to the necessary design changes by the CAD user, the CAE user, the CAM user, and the Manufacturer, for example. Further as each of the CAD/CAE/CAM users modify the solid model, a data model that defines the solid model is also modified to properly account for the changes discussed above and properly stored in the solid model data files 325. The manufacturer then proceeds to produce the physical product 330 according to the original design specifications and subsequent engineering modifications. The virtual product development occurs in a system, where the system and method for modifying geometric relationships in a solid model is executable in a variety of software applications resident in memory on a variety of hardware systems, described in more detail below.

2. Computer Program Product

Figure 4:
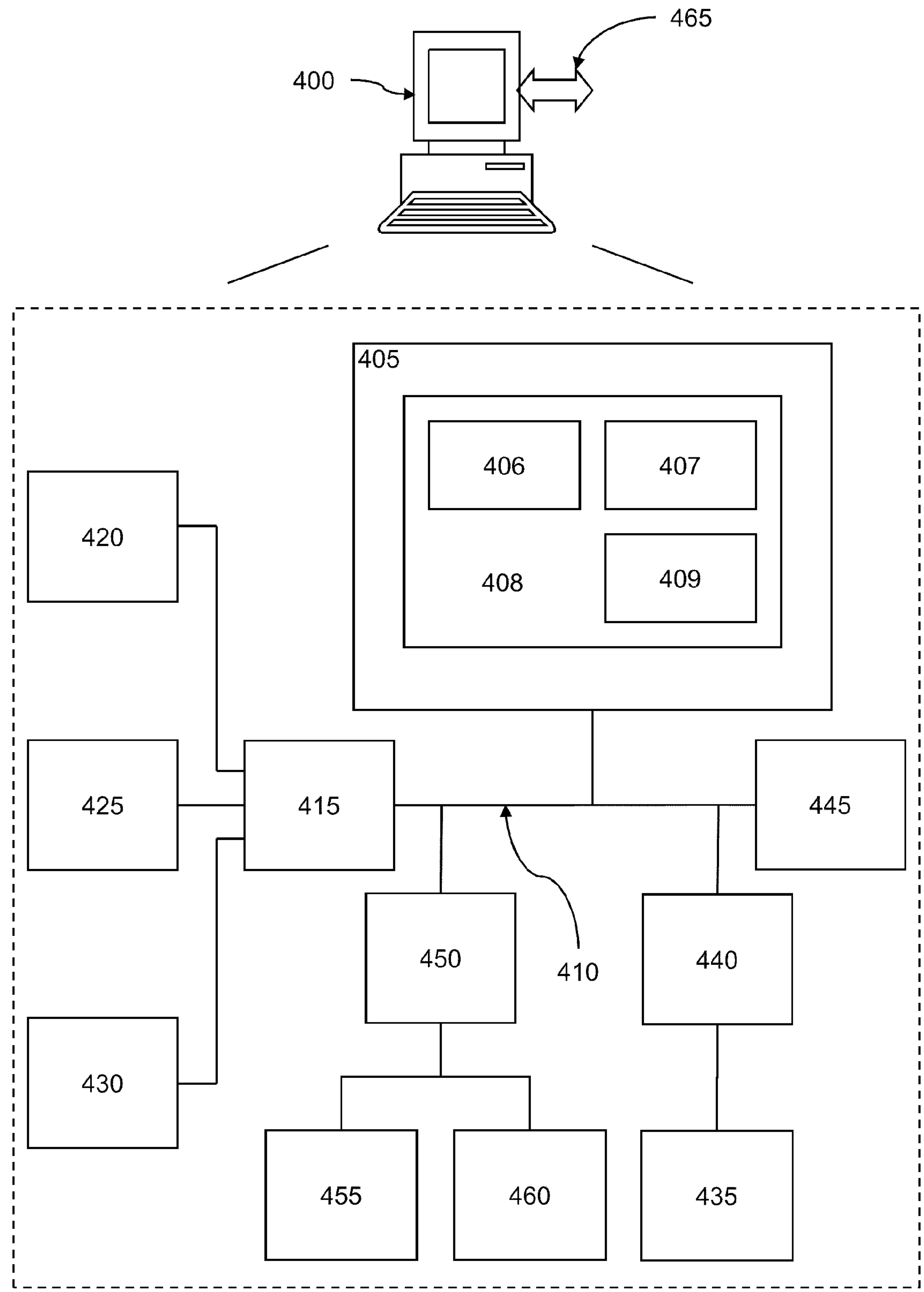
FIG. 4 is a block diagram of a computer environment in which the system may be practiced.

Turning now to a hardware system, FIG. 4 is a block diagram of a computer system in which the system may be practiced. FIG. 4 and the following discussion are intended to provide a brief, general description of a suitable hardware system and computing environment in which the embodiment may be implemented. The embodiment may be performed in any of a variety of known computing environments.

Referring to FIG. 4, an exemplary computer system includes a computing device in the form of a computer 400, such as a desktop or laptop computer, which includes a plurality of related peripheral devices (not depicted). The computer 400 includes a central processing unit (CPU) 405 and a bus 410 employed to connect and enable communication between the central processing unit 405 and a plurality of components of the computer 400 in accordance with known techniques. The operation of the CPU 405 is well understood in the art that is preferably an electric circuit that can execute computer programs having computer-executable instructions encoded thereon, such as program modules, which are executed by the computer 400. Generally, program modules include routines, programs, objects, components, data structures, etc., that perform particular tasks or implementation particular data types. Preferably the program modules include a file processing module 406, a data display module 407, a logic processing module 408, and a method processing module 409. The logic processing module 408 sends requests to the file processing module 406, the data display module 407 and the method processing module 409 to operate according to the computer-executable instructions. Likewise the logic processing module receives requests from the file processing module 406, the data display module 407 and the method processing module 409 to operate according to the computer-executable instructions. The bus 410 also enables communication among the various program modules and the plurality of components. The bus 410 may be any of several types of bus structures including a memory bus or memory controller, a peripheral bus, and a local bus using any of a variety of bus architectures. The computer 400 typically includes a user interface adapter 415, which connects the central processing unit 405 via the bus 410 to one or more interface devices, such as a keyboard 420, mouse 425, and/or other interface devices 430, which can be any user interface device, such as a touch sensitive screen, digitized pen entry pad, etc. The bus 410 also connects a display device 435, such as an LCD screen or monitor, to the central processing unit 405 via a display adapter 440. The bus 410 also connects the central processing unit 405 to a memory 445, which can include ROM, RAM, etc.

The computer 400 further includes a drive interface 450 that couples at least one storage device 455 and/or at least one optical drive 460 to the bus. The storage device 455 can include a hard disk drive, not shown, for reading and writing to a disk, a magnetic disk drive, not shown, for reading from or writing to a removable magnetic disk drive. Likewise the optical drive 460 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 400 that is accessible by the file processing module 406 according to instructions received by the logic processing module 408 in the method described by instructions provided by the method processing module 409.

The computer 400 can communicate via a communications channel 465 with other computers or networks of computers. The computer 400 may be associated with such other computers in a local area network (LAN) or a wide area network (WAN), or it can be a client in a client/server arrangement with another computer, etc. Furthermore, the embodiment may also be practiced in distributed computing environments where task instructions provided by the logic processing module 408 in the method described by instructions provided by the method processing module 409 and are performed by remote processing devices that are linked through a communications network. In a distributed computing environment, the program modules may be located in both local and remote memory storage devices. All of these configurations, as well as the appropriate communications hardware and software, are known in the art.

Figure 5A:
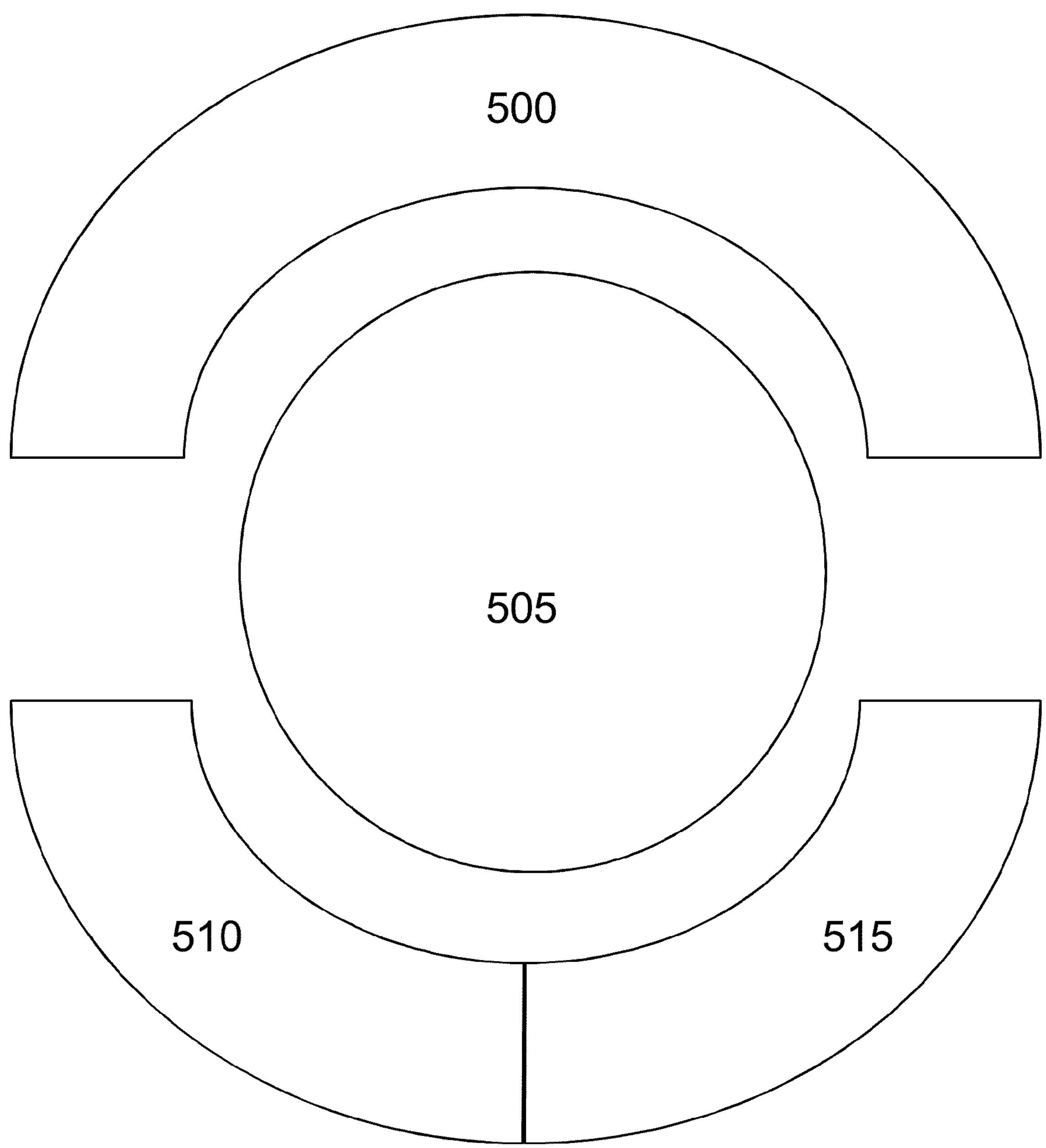
FIG. 5 illustrates a general concept of a software programming code embodied in a software application
Figure 5B:
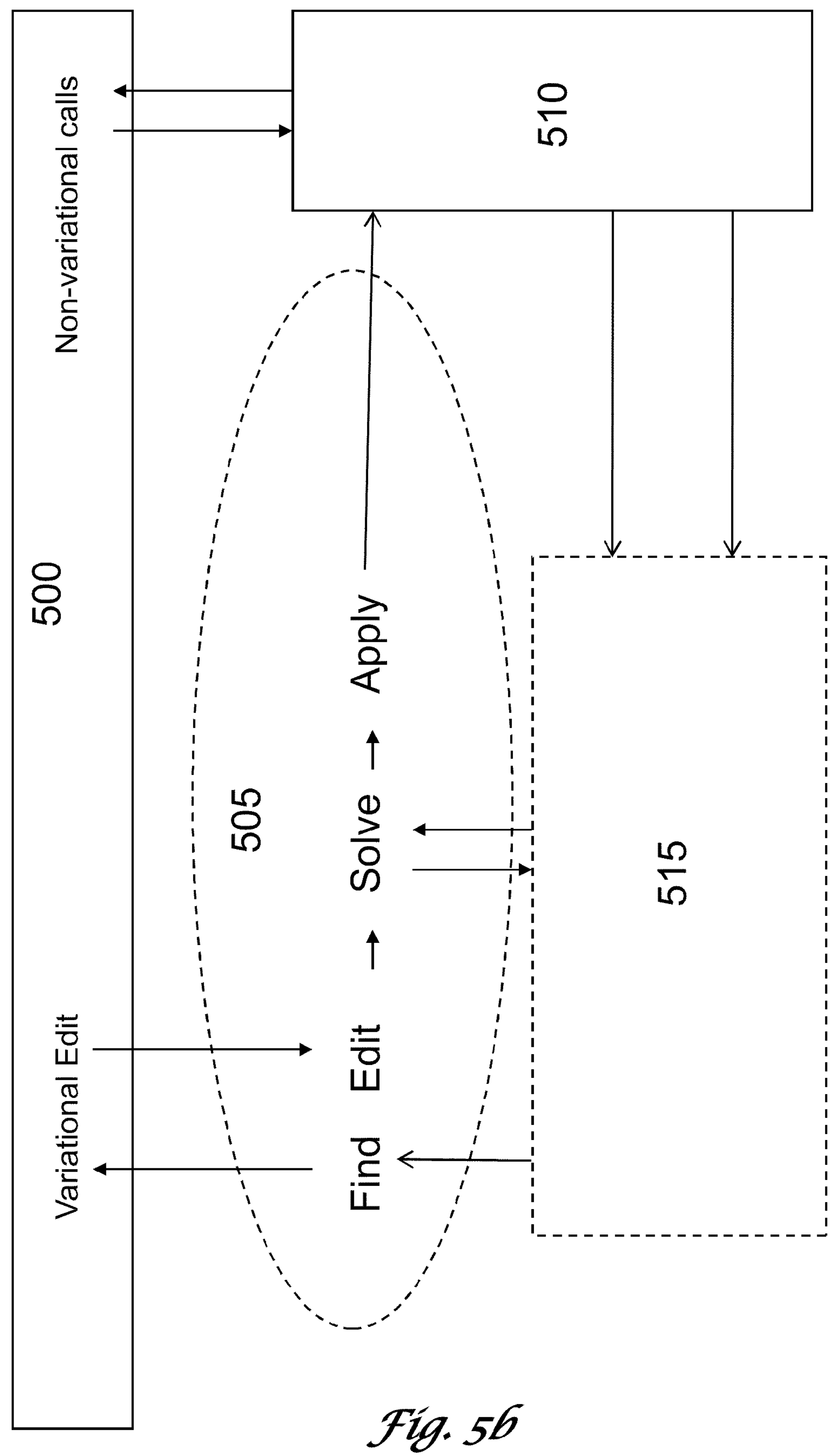

Turning now to the program modules in more detail, FIGS. 5*a*-5*b* illustrate a general concept of a software programming code embodied in a software application. Referring further to FIG. 5*a*, the program modules will be described in more detail below in the context of the embodiment where a software application 500 contains accessible program modules as those discussed above. The software application 500 may be in the form of a solid modeling application such as the aforementioned CAD application 205, the CAE application 210 or CAM application 215. Further it is contemplated that the software application 500 is provided by a third party vendor with particular API ("application programming interface") call features for access and utilization. Continuing, as the user interacts with the software application 500, certain modification events trigger interaction with a variational modeling toolkit 505, to be discussed in greater detail below. The software application 500 and the variational modeling toolkit 505 together or individually utilize the logic processing module 408 in the method described by instructions provided by the method processing module 409 to call a low-level geometric modeling kernel to accomplish the certain modification events of the solid model according to the commands selected by the user and executed by the software application 500, as generally understood in the art of solid modeling, but also discussed in more detail below. The low-level geometric modeling kernel is commonly a collection of at least a three-dimensional (3D) geometric modeler 510 like Parasolid licensed by Siemens Product Lifecycle Management Software Inc and a collection of geometric software component libraries 515 like the 3D DCM (or "DCM") product offered by Siemens Product Lifecycle Management Software Inc.

Put another way, referring to FIG. 5*b*, the variational modeling toolkit 505 operates on variational edit commands communicated from the software application 500. Additionally, the software application 500 communicates non-variational modeling calls to the 3D geometric modeler 510, and the 3D geometric modeler 510 utilizes the collection of geometric software component libraries 515 as normally understood in the art of geometric modelers. With regard to the variational modeling toolkit 505, and to be discussed in greater detail below, several operations occur related to the variational edit that involve find, edit, solve and apply. It is commonly understood in the art of solid modeling that the collection of geometric software component libraries above provides modeling functionality such as geometric constraint solving, variational design, parametric design, motion simulation, collision detection, clearance computations, topology location, topology move solution, and hidden line removal, for example. It is also contemplated to be within the scope of this embodiment that the 3D geometric modeler 510 and the component libraries 515 are components of the same application rather than separate components, or combinations thereof. Having described the computer program product, more detail is now provided with regard to a system.

3. Active Selection System

Figure 6:
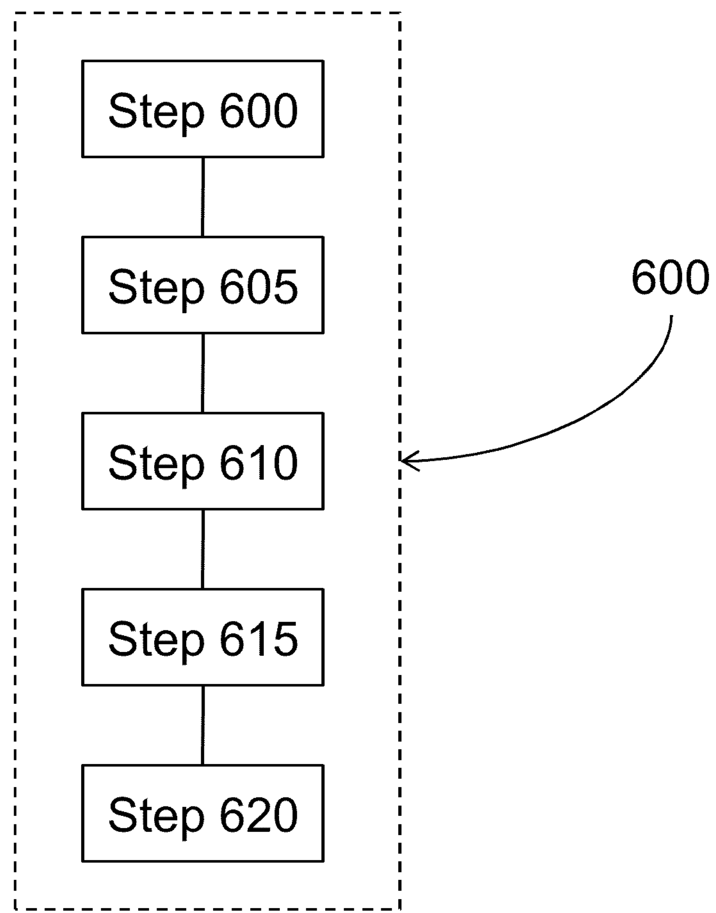
FIG. 6 is a box diagram of a general view of a method employed by the embodiment.

Turning now to the active selection system, FIG. 6 is a box diagram of a general view of a method employed by the embodiment. Referring to FIG. 6, the embodiment discloses the logic processing module 408 using the method described by instructions provided by the method processing module 409, where the described method is a method for selecting modification features on a solid model that is manipulated in a computer having software instructions for design, generally depicted at 600. The following steps are mentioned to provide an overview of the embodiment described in the system having details that are subsequently discussed. The system selects a modification feature directly on a solid model using a computer peripheral input that communicates a modification intent from a user (Step 600). The system suggests a plurality of additional selection features to include with the modification feature (Step 605). The system verifies that the included plurality of additional selection features conforms to the modification intent by a visual highlighting (Step 610). The system modifies the solid model according to the modification intent that results in a modified solid model and modified visual display information (Step 615). The system displays the modified solid model using the modified visual display information to the user (Step 620).

4. Active Selection Method

Figure 7:
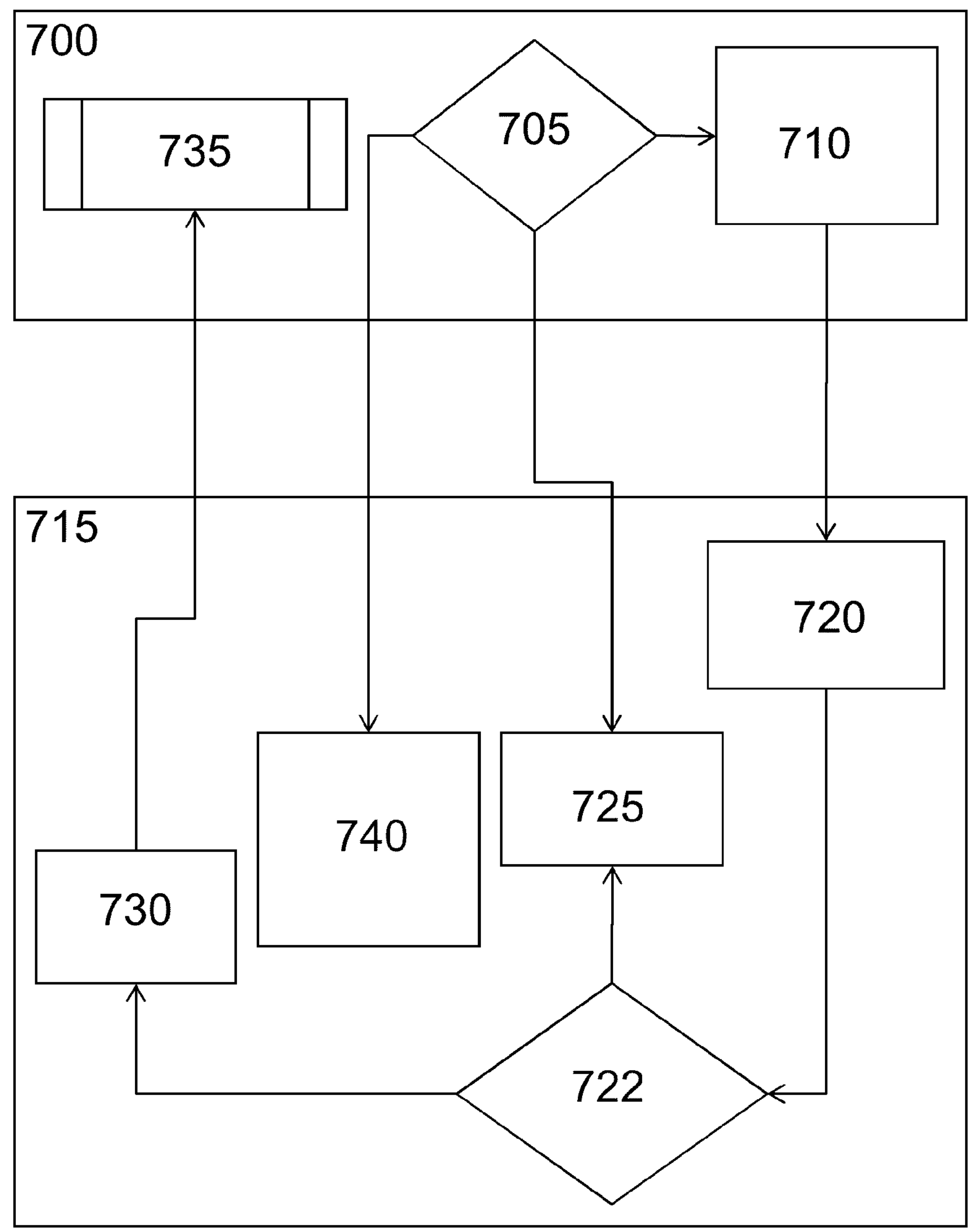
FIG. 7 is a box diagram of a general view of a method employed by the embodiment.

Turning now to the active selection system in greater detail, FIG. 7 is a box diagram of a general view of a method employed by the embodiment. Referring to FIG. 7, a gesture interpretation ("GI") module at 700 receives notifications and messages from preferably the mouse 425 and interprets what will happen at a mouse event at 705 that preferably includes the selection of a modification topology. The gesture interpretation module at 700 receives the notification and directs a highlight of the selected object at 710. The highlight of a selected object at 710 directs the action towards an active selection module at 715. In the active selection module at 715, a motion sensitive launcher at 720 is created to interface with the active selection, the details of the motion sensitive launcher at 720 will be discussed below, with the motion sensitive launcher created using the following sample pseudo-code:

```
Handle Create_MSL_interface (device_id, mouse_position,
msl_callback, callback data)
{
    if MSL_manager is not created yet
        create a MSL_manager
    ask MSL_manager to
        create and display the MSL interface with fade-in effect
        set MSL_displau_flag = true
    return a handle of the MSL_manager back to GI client
}
```

After the MSL interface is active, the gesture interpretation module at 700 need to continuously inform the motion sensitive launcher at 720 manager about the current mouse position on the graphics (display) window so the manager can track the mouse and decide if it needs to dismiss the MSL interface. Also the manager needs to track if the mouse is over the interface itself, so it could launch the shortcut menu callback, according to the sample pseudo-code:

```
Boolean Track_MSL_interface (MSL_manager, mouse_position)
{
    set MSL_dismiss_flag = FALSE
    if the MSL_manager == NULL
        return MSL_dismiss_flag
    asl MSL_manager to
        if distance between mouse_position and the center of the
        MSL_interface > defined threshold radius
            call Dismiss_MSL_interface
            set MSL_dismiss_flag = TRUE
        if mouse if over the MSL_interface
            call Dismiss_MSL_interface
            launch shortcut menu callback
            set MSL_dismiss_flag = TRUE
    return MSL_dismiss_flag
}
```

If the mouse 425 is no longer on a modification topology at 722, meaning the designer has determined to move away from the modification object, then the motion sensitive launcher at 720 is dismissed at 725 or a callback event occurs at 730 such that the gesture interpretation module at 700 receives control and displays a selection intent shortcut menu at 735. Alternatively, the mouse event 705 could indicate the dismissal of the selection intent shortcut menu at 740 as well, according to the following sample pseudo-code:

```
Void Dismiss_MSL_interface (MSL_manager)
}
    if MSL_manager == NULL
        return
    ask MSL_mananger to
        fade away the interface
        destroy and delete the interface
        set the MSL_display_flag = FALSE
    return
{
```

The selection intent shortcut menu can be a mouse-activated popup and launched by the gesture interpretation module. The gesture interpretation module client would preferably pass the topological structure to the gesture interpretation module as part of the request to the gesture interpretation module to launch the motion sensitive launcher at 720. Alternatively, Microsoft's minibar behavior can be employed, i.e., fade-in while positioning the menu and fade out while moving the mouse away from a threshold region. It is therefore also contemplated that the motion sensitive launcher and related manager is used to launch any kind of tool and/or menu. Sample pseudo-code:

```
boolean Launch_MSL_tool (MSL_manager, device_id, menu_data,
mouse_position)
{
    set menu_create_flag = FALSE
    if MSL_manager == NULL
        return menu_create_flag
    if MSL_display_flag = TRUE
        call Dismiss_MSL_interface
    ask MSL_manager to
        create a client menu
        display the menu at the mouse position with fade-in effect
        set menu_pointer = menu
        set menu_create_flag = TRUE
    return menu_create_flag
}
```

After the client tool is positioned, the gesture interpretation module preferably informs the MSL manager about the current mouse position on the graphics window, so the gesture interpretation module could track if the mouse has traveled outside the threshold region and decide if it needs to dismiss the tool, with the following sample pseudo-code:

```
Boolean Track_MSL_tool (MSL_manager, shortcut_menu,
mouse_position)
}
```

-continued

```
    menu_dismiss_flag = FALSE
    if the MSL_manager == NULL
        return menu_dismiss_flag
    ask MSL_manager == NULL
        return menu_dismiss_flag
    ask MSL_manager to
```

-continued

```
        if menu_pointer != NULL
            if the mouse travels outside the offset of the defined
            rectangular region of the menu
                call Dismiss_MSL_tool
                set menu_dismiss_flag = TRUE
            if the mouse is on the menu and an item is selected
                launch a callback to apply the rule
                call Dismiss_MSL_tool
                set menu_dismiss_flag = TRUE
    return menu_dismiss_flag
{
The MSL tool is dismissed when an item on the menu is selected, or a
mouse has traveled outside the defined threshold region, or any
non-motion mouse event may trigger the closing, having the following
sample pseudo-code:
Void Dismiss_MSL_tool (MSL_manager)
{
    if MSL_manager == NULL
        return
    ask MSL_manager to
        fade away the menu
        destroy and delete the menu
    return
}
```

Figure 8:
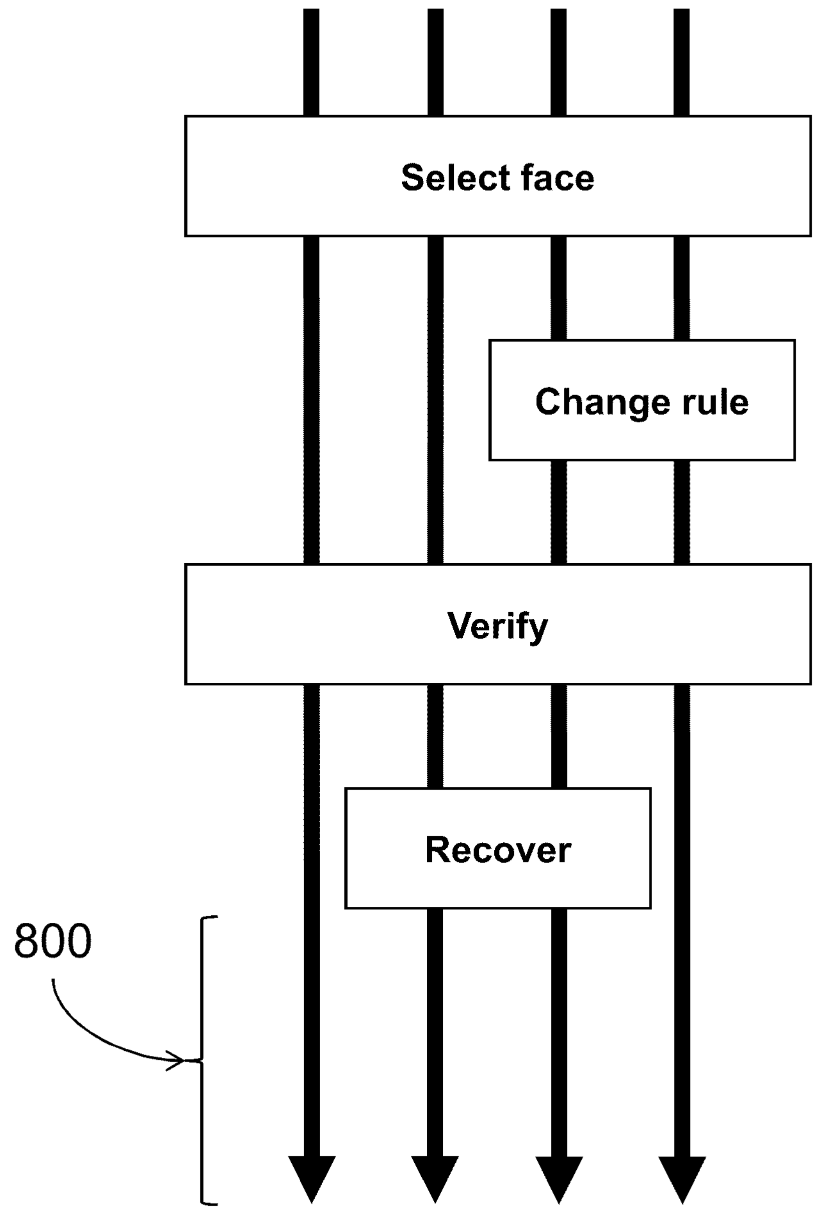
FIG. 8 illustrates an active selection interaction resulting from the use of the disclosed system.

FIG. 8 illustrates a planning ahead interaction resulting from the use of the disclosed system. Referring to FIG. 8, it is apparent that while the number of interaction pathways is reduced to four, generally illustrated at 800, it is important to note that the two most penalty-laden interaction pathways have been removed. Preferably illustrated, within the interaction pathway the decision processing of changing the option is made from before an object is selected to after an object is selected. A GOMS (Goals, Operations, Methods, Selection) analysis illustrates the improved efficiency due to the simplicity of reducing the interaction pathways, illustrated in the following Table:

| | Time | % Time | look at (distant) 0.44 | look at (near) 0.17 | Verify rule 1.2 | cursor to target Fitt's | target | target size (cm) | target distance (cm) | Open list 0.2 | Visual search Hick's | items in list | click 0.2 | Verify selection 1.2 |
|---|---|---|---|---|---|---|---|---|---|---|---|---|---|---|
| Current, likely | 5.288 | 100% | | | | | | | | | | | | |
| Interpret rule | 1.64 | 31% | 0.44 | | 1.2 | | | | | | | | | |
| Change rule (current) | 1.549 | 29% | | 0.17 | | 0.41 | option menu | 0.6 | 10 | 0.2 | 0.56 | 9 | 0.2 | |
| Select face | 0.898 | 17% | 0.44 | | | 0.26 | face | 2 | 10 | | | | 0.2 | |
| Verify selection | 1.2 | 23% | | | | | | | | | | | | 1.2 |
| Current, worst | 7.452 | 100% | | | | | | | | | | | | |
| <Current, likely> | 5.288 | 71% | | | | | | | | | | | | |
| Recover | 2.165 | 29% | | | | | | | | 0.2 | 0.56 | 9 | 0.2 | 1.2 |
| Suggestive, expected | 2.972 | 100% | | | | | | | | | | | | |
| Select face | 0.898 | 30% | 0.44 | | | 0.26 | face | 2 | 10 | | | | 0.2 | |
| Change rule (suggestive) | 0.873 | 29% | | 0.17 | | 0.06 | icon | 0.9 | 0.5 | | 0.44 | 5 | 0.2 | |
| Verify selection | 1.2 | 40% | | | | | | | | | | | | 1.2 |
| Suggestive, worst | 5.136 | 100% | | | | | | | | | | | | |
| <Suggestive, expected> | 2.972 | 58% | | | | | | | | | | | | |
| Recover | 2.165 | 42% | | | | | | | | 0.2 | 0.56 | 9 | 0.2 | 1.2 |

For this analysis, mouse pointer travel from the scene to interface and back is averaged at 10 centimeters screen distance, which will vary in actual practice but was held constant for this analysis. Further, the face size to move was 2 centimeters square but did not account for the need to rotate the view, zoom, etc., to select a modification face. Also as seen from the results in the above table, it does not take the average designer 5.288 seconds to execute the first scenario but it is representative of the mechanical and mental time required for the task itself while removing ancillary human behavior. From the numbers it is easy to see that recovery is expensive. Preparation in the "Current, likely" scenario is also relatively expensive, accounting for 60% of the task. Preferably, the suggestive interface will "reduce preparation" and will "substantially reduce the need for recovery."

5. Active Selection Illustration

Figure 9A:
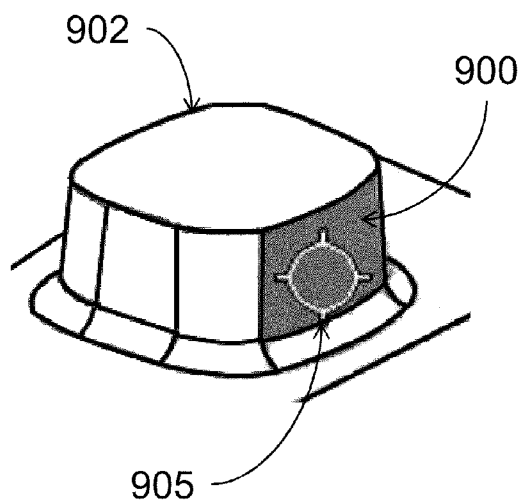
FIGS. 9*a*-9*d* illustrate an exemplary active selection in a solid model modification system.
Figure 9B:
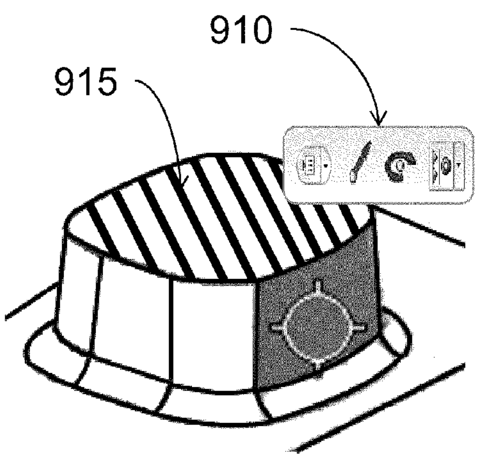
Figure 9C:
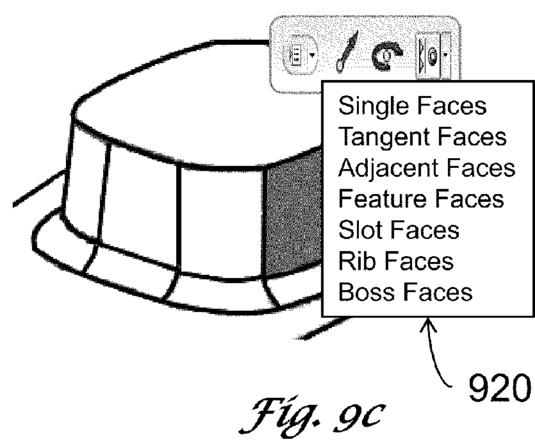
Figure 9D:
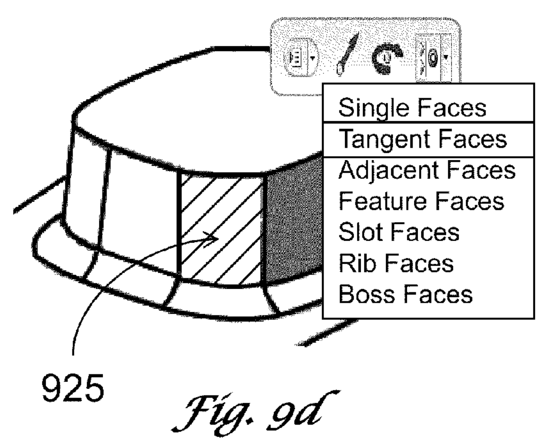

FIGS. 9*a*-9*d* illustrate an exemplary active selection in a solid model modification system. Referring to FIG. 9*a*, a designer selects a modification face 900 on a boss feature 902 by use of a mouse pointer 905 that results in the highlighting of the modification face 900. The designer can determine before selection that a selection intent will be a single face as depicted, or in the alternative, the system can provide a drop-down menu of choices for active selection when the mouse pointer 905 is positioned over the modification face 900 for a predetermined amount of time, e.g., 2 seconds, or immediately following. Referring to FIG. 9*b*, an active toolbar 910 is displayed preferably within 2 centimeters in display screen distance of the mouse pointer 905, where it is contemplated that the active toolbar 910 is modeless, passive and that selection can continue without having to first dismiss the active toolbar 910. Because of the designer's intent, a single face 915 is automatically highlighted to satisfy the selection intent. Referring to FIG. 9*c*, the designer could intend to select a different face to include in his modification, in so doing, the active toolbar provides other alternative suggestions in an active selection window 920 that preferably display geometric conditions or topological proximity, for example, Tangent Faces, Adjacent Faces, and Feature Faces. Referring to FIG. 9*d*, the designer selected "Tangent Faces" that results in the highlighting and selection of a tangent face 925. The designer can select the boss feature 902 face-by-face as illustrated, or can select the boss feature 902 in its entirety using the active selection window 920 displaying "Boss Faces."

Figure 10:
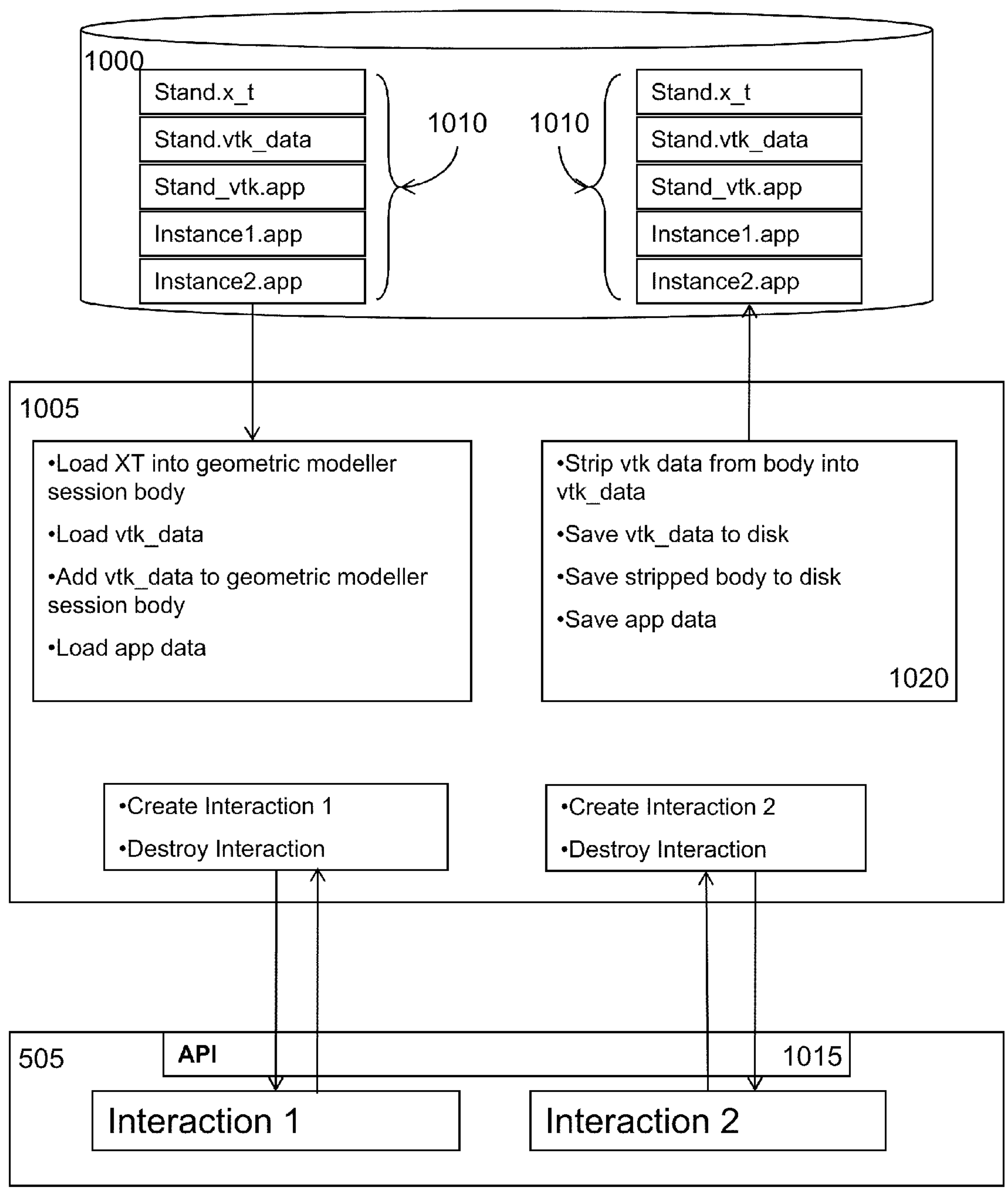
FIG. 10 illustrates an exemplary solid model modification system.

FIG. 10 illustrates an exemplary solid model modification system. The user using the software application 500 executes the necessary commands for the software application 500 to access the storage device 455 that is preferably a hard disk drive 1000 having data related to a virtual representation of a solid model stored in the solid model data files 525 that are preferably accessible by the software application 500, the variational modeling toolkit 505, the 3D geometric modeler 510 and the component libraries 515. Referring further to FIG. 10, the software application 500 is characterized by a solid modeling application 1005 that accesses the solid model data files 525 structured preferably as data files 1010 stored on the hard disk drive 1000 in preferably a stand.x_t format that refers to a modeler transmit file type for the 3D geometric modeler 510, a stand.vtk_data format that refers to a variational modeling toolkit information file type for the variational modeling toolkit 505, where stand* refers to a generic part file name. The solid modeling application 1005 has its own recognized file type extensions, for example APP, which it uses to obtain sufficient information for manipulation of the solid model. Continuing, the solid modeling application 1005 loads the stand.x_t file into a 3D geometric modeler session body to be accessed by the 3D geometric modeler 510. The stand.vtk_data file is loaded and added to the 3D geometric modeler session body. The solid modeling application 1005 loads the application data relating to the solid model and accesses the data files 1010 according to its own file type, for example PRT. Once the interaction has been created, to be discussed later, the variational modeling toolkit 505 handles the modification computations by way of the variational modeling toolkit API 1015, which is discussed in more detail below. Following the solid model modification, in order to save the modified solid model to the hard disk drive 1000, block 1020 illustrates the data related to the variational modeling toolkit 505 is striped from the solid model and placed into a vtk_data data structure that is then saved to the stand.vtk_data file. The stripped solid body is also saved to the hard disk drive 1000, as is the application data.

6. Conclusion

The embodiment may be implemented in digital electronic circuitry, or in computer hardware, firmware, software, or in combinations thereof. An apparatus of the embodiment may be implemented in a computer program product tangibly embodied in a machine-readable storage device for execution by a programmable processor; and method steps of the embodiment may be performed by a programmable processor executing a program of instructions to perform functions of the embodiment by operating on input data and generating output.

The embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include numerous forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application2-specific integrated circuits).

A number of embodiments have been described. It will be understood that various modifications may be made without departing from the spirit and scope of the embodiment. It is anticipated that the disclosed active selection system will work as well with conditions such as coplanar, coaxial, etc., as it does with features. Therefore, other implementations are within the scope of the following claims.

What is claimed is:

1. A system for selecting modification features on a solid model that is manipulated in a computer having software instructions, comprising:

- a computer system, wherein the computer system includes a memory, a processor, a user input device, and a display device;
- a computer generated geometric model stored in the memory of the computer system; and
- wherein the computer system
  - selects a modification feature directly on a solid model using a computer peripheral input that communicates a modification intent from a user;
  - suggests a plurality of additional selection features to include with the modification feature based on geometric conditions or topological proximities between the plurality of additional selection features and at least one face corresponding externally to the modification feature, the suggestion based on a user selection from displayed options including tangent faces, adjacent faces, and feature faces, wherein the at least one face is automatically highlighted;

verifies that the included plurality of additional selection features conforms to the modification intent by a visual highlighting;

modifies the solid model according to the modification intent that results in a modified solid model and modified visual display information; and displays the modified solid model using the modified visual display information to the user.

2. The system of claim 1, wherein the computer system displays a solid model without design intent intelligence computed from the visual display information extracted from the solid model data file.

3. The system of claim 1, wherein the computer system loads a solid model data file having visual display data into a solid model modeling application.

4. The system of claim 3, wherein the computer system computes the modified solid model into the solid model data file.

5. A method for selecting modifications to a solid model, comprising:

selecting a modification feature directly on a solid model using a computer peripheral input that communicates a modification intent from a user;

suggesting a plurality of additional selection features to include with the modification feature based on geometric conditions or topological proximities between the plurality of additional selection features and at least one face corresponding externally to the modification feature, the suggestion based on a received user selection from displayed options including tangent faces, adjacent faces, and feature faces, wherein the at least one face is automatically highlighted;

verifying that the included plurality of additional selection features conforms to the modification intent by a visual highlighting;

modifying the solid model according to the modification intent that results in a modified solid model and modified visual display information; and displaying the modified solid model using the modified visual display information to the user.

6. The method of claim 5, further comprising displaying a solid model without design intent intelligence computed from the visual display information extracted from the solid model data file.

7. The method of claim 5, further comprising loading a solid model data file having visual display data into a solid model modeling application.

8. The method of claim 7, further comprising computing the modified solid model into the solid model data file.

9. A non-transitory computer usable medium having a computer readable program code embodied therein, the computer readable program code adapted to be executed by a computer processor to:

provide a logic processing module, a display processing module, and a method processing module;

select a modification feature directly on a solid model using a computer peripheral input that communicates a modification intent from a user in a solid modeling application, and wherein the selecting is performed by a method processing module in response to being called by the logic processing module;

calculate a plurality of additional selection features to include with the modification feature based on geometric conditions or topological proximities between the plurality of additional selection features and at least one face corresponding externally to the modification feature, and wherein the calculating is performed by the method processing module in response to being called by the logic processing module, and is based on a user selection from displayed options including tangent faces, adjacent faces, and feature faces, wherein the at least one face is automatically highlighted;

verify that the included plurality of additional selection features conforms to the modification intent by a visual highlighting, wherein the verifying is performed by the display processing module in response to receiving the calculated and selected information from the method processing module communicated to the logic processing module;

modify the solid model according to the modification intent that results in a modified solid model and modified visual display information, and wherein the modifying is performed by a method processing module; and display the modified solid model using the modified visual display information from the modification processing module by the display processing module to the user.

10. The computer usable medium of claim 9, further adapted to be executed by a computer processor to display the solid model without design intent intelligence computed from the visual display information extracted from the solid model data file, and wherein the displaying is performed by a display processing module in response to being called by the logic processing module.

11. The computer usable medium of claim 10, further adapted to be executed by a computer processor to provide the system with a data file processing module.

12. The computer usable medium of claim 11, further adapted to be executed by a computer processor to load the solid model data file having visual display data into the solid model modeling application, and wherein the loading is performed by a data file processing module in response to being called by the logic processing module.

13. The computer usable medium of claim 11, further adapted to be executed by a computer processor to compute the modified solid model into the solid model data file by data file processing module in response to being called by the logic processing module.

14. A system for selecting modifications to a solid model representation that is manipulated in a computer having software instructions for design, comprising:

a computer system, wherein the computer system includes a memory, a processor, a user input device, and a display device;

a computer generated geometric model stored in the memory of the computer system; and wherein the computer system loads a solid model data file having visual display data into a solid model modeling application;

displays a solid model without design intent intelligence computed from the visual display information extracted from the solid model data file;

selects a modification feature directly on a solid model using a computer peripheral input that communicates a modification intent from a user;

suggests a plurality of additional selection features to include with the modification feature based on geometric conditions or topological proximities between the plurality of additional selection features and at least one face corresponding externally to the modification feature, the suggestion based on a user selection from displayed options including tangent faces, adjacent faces, and feature faces, wherein the at least one face is automatically highlighted;

verifies that the included plurality of additional selection features conforms to the modification intent by a visual highlighting;

modifies the solid model according to the modification intent that results in a modified solid model and modified visual display information;

computes the modified solid model into the solid model data file; and displays the modified solid model using the modified visual display information to the user.

* * * * *